(12) United States Patent
Carmody

(10) Patent No.: US 8,571,603 B2
(45) Date of Patent: Oct. 29, 2013

(54) TELEPHONE COMPUTING SYSTEM AND DEVICES

(76) Inventor: James C. Carmody, Schwenksville, PA (US)

( * ) Notice: Subject to any disclaimer, the term of this patent is extended or adjusted under 35 U.S.C. 154(b) by 0 days.

(21) Appl. No.: 13/068,265

(22) Filed: May 6, 2011

(65) Prior Publication Data

US 2012/0282978 A1  Nov. 8, 2012

(51) Int. Cl.
*H04B 1/38* (2006.01)
*H04M 1/00* (2006.01)

(52) U.S. Cl.
USPC .................................... 455/557; 455/575.1

(58) Field of Classification Search
USPC .......... 455/556.1–559, 575.1–575.6; 711/162
See application file for complete search history.

(56) References Cited

U.S. PATENT DOCUMENTS

| | | | | |
|---|---|---|---|---|
| 5,625,829 A * | 4/1997 | Gephardt et al. | ............. | 710/104 |
| 6,538,880 B1 * | 3/2003 | Kamijo et al. | ............. | 361/679.4 |
| 6,697,032 B2 * | 2/2004 | Chitturi et al. | ................ | 345/168 |
| 2002/0023198 A1 * | 2/2002 | Kokubun et al. | .............. | 711/162 |
| 2003/0041206 A1 * | 2/2003 | Dickie | ........................ | 710/303 |
| 2004/0019724 A1 * | 1/2004 | Singleton et al. | ............. | 710/303 |
| 2008/0155159 A1 * | 6/2008 | Rivas et al. | .................... | 710/305 |
| 2008/0304688 A1 * | 12/2008 | Kumar | ......................... | 381/370 |
| 2011/0256905 A1 * | 10/2011 | Ryan | ......................... | 455/556.1 |

* cited by examiner

*Primary Examiner* — Lester Kincaid
*Assistant Examiner* — Daniel Lai
(74) *Attorney, Agent, or Firm* — John F. A. Earley, III; Frank J. Bonini, Jr.; Harding, Earley, Follmer & Frailey, P.C.

(57) ABSTRACT

A system and devices for facilitating computing operations through a smartphone device and an associated shell unit, where the smartphone is configured to interface with a shell unit by connecting to a receiving port of the shell unit to provide computing functions and a data resource for the shell unit, where according to one embodiment, the smartphone device is configured as an improved smartphone that is configured to operate shell unit functions, such as, for example, a display of the shell unit, a keyboard of the shell unit, or other elements of the shell unit. The data may be carried on the smartphone device, used by the shell unit and smartphone, and the shell unit may be provided with a storage component, such as a hard drive, that may store backup data from the smartphone device. Logs may be used to sync the data on the smartphone device and the shell unit.

19 Claims, 4 Drawing Sheets

TELEPHONE COMPUTING SYSTEM AND DEVICES

BACKGROUND OF THE INVENTION

1. Field of the Invention

The present invention relates to the field of computing devices and more particularly to devices that may be used for telephone communications and for computing operations.

2. Brief Description of the Related Art

Individuals utilize a variety of electronic devices, including personal electronic devices, such as, for example, smartphones, desktop computers, laptop computers, notebook computers, e-readers, and tablet computers. In many instances, these devices have individual operating systems and individual data platforms. For example, data maintained on a device, such as a smartphone, may be updated, and, in the event the data includes contacts, then users also must update another device, such as, for example, a laptop computer that also is to maintain the same data. In order for a user to use the information on a user's smartphone, the user is required to synchronize the smartphone with a computer. Data syncs between the smartphone and the computer are used so that the data may be updated in both places.

In some instances, data may be stored in a remote location, such as, for example, with cloud computing, where a server may be accessed by a smartphone or computer, and may contain data that may be accessed from each device. However, this type of data storage has drawbacks, in that the user never has the data unless a remote connection to the data is available. Therefore, in many instances, a smartphone will contain data, and a laptop or other computing device will also contain data which may be inconsistent, as the data on each component may be updated or changed independently of the other.

A need exists for a system and device that is capable of storing data in a usable manner that may be stored in a single location or on a single device and accessed by multiple computing devices.

SUMMARY OF THE INVENTION

The present invention provides a system and devices for facilitating computing operations through a smartphone and an associated shell unit, where the smartphone is interfaced with the shell unit to provide computing functions and a data resource for the shell unit.

According to a preferred embodiment, the device is configured as an improved smartphone that is configured to operate one or more functions of an associated shell unit, such as, for example, a display of the shell unit, a keyboard of the computing unit, or other element of the shell unit.

According to other embodiments, a system is provided where a smartphone device and an associated shell unit are able to utilize data from one or the other or both.

According to another embodiment, a system is provided where a smartphone device and an associated shell unit are able to utilize data that may be stored on a storage component, such as a hard drive, flash memory, or removable storage media of the smartphone device that may be used to hold data for computing functions for both the smartphone device and the shell unit to access the stored data.

According to one embodiment, the smartphone device is configured with a first processor and the shell unit is configured with a second processor, and more preferably, the processors are symmetrical processors configured to utilize data stored on a storage component of the smartphone device.

According to another embodiment, a shell unit is provided that is constructed to associate with a mobile telephone, such as, for example, a smartphone. According to one embodiment, the shell unit has one or more components, such as, for example, a display, keyboard or other input mechanism, storage media, such as, for example, a hard drive, a processor and memory (e.g., random access memory (RAM)).

It is an object of the invention to provide a system and devices for integrating a mobile telephone (e.g., a smartphone) and the functions of a shell unit, so that the mobile telephone may hold data and include processing capability, and further is configured to operate with the shell unit. According to some embodiments, the shell unit may share the processor of the mobile telephone when the mobile telephone is connected with the computing unit, or, according to preferred embodiments, the shell unit may have a processor and the mobile telephone may have a processor.

According to embodiments, the system and devices include software with instructions for implementing programs to manage data among the smartphone device and the associated shell unit. For example, according to one management program, the application data from the smartphone device is stored on the shell unit, and preferably may include archiving of data, such as older data files, from the smartphone to allocation on the storage component of the shell unit that receives the smartphone. Associations may be implemented to automatically recognize a particular smartphone, or particular smartphones with one or more particular shell units, so that there is controlled data exchange and backup to trusted locations (as opposed to a general use or publicly shell unit).

According to preferred embodiments, the smart phone device and shell unit may be configured to be operated in one or more modes, including a smartphone mode, where the smartphone is operably active to make and receive calls, a hybrid mode where the smartphone is operably active to make and receive calls and carry out data and computing functions with the shell unit. The modes may be user selected, or automatically configured (based on the connection), of the smartphone and the status shell unit. The hybrid mode may include a netbook mode where the shell unit is configured as a netbook and tablet mode where the shell unit is configured as a tablet. Optionally, according to alternate embodiments, the user may select between, or change operating modes.

BRIEF DESCRIPTION OF THE DRAWING FIGURES

FIG. 1b is a right side elevation view of the smartphone of FIG. 1a.

FIG. 1c is a front elevation view of the device of FIG. 1a.

FIG. 3b is a right side elevation view of the shell unit of FIG. 3a.

DETAILED DESCRIPTION OF THE PREFERRED EMBODIMENTS

Figure 1C:
Figure 1A:
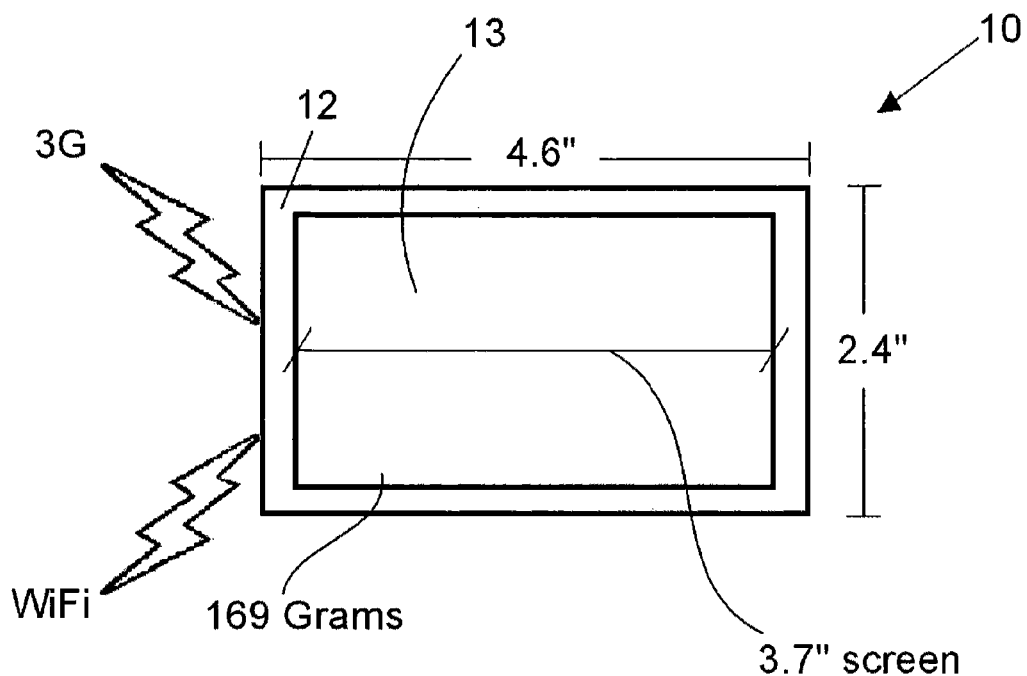
FIG. 1a is top plan schematic view of smartphone according to an embodiment of my invention.
Figure 1B:
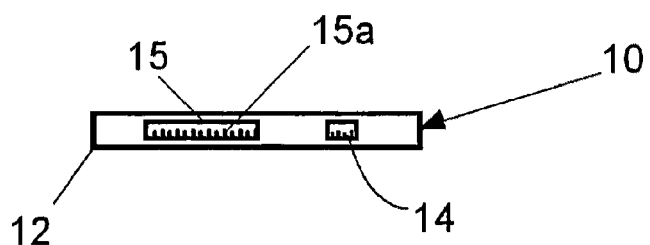

Referring to FIGS. 1 to 5 embodiments are shown illustrating a system for facilitating telephone computing. A smartphone device 10 is provided for use with a shell unit 11. Preferably, the smartphone device 10 is configured having suitable dimensions, weight and size to be used as a mobile telephone. The smartphone device 10 is shown having a casing 12 and a screen display 13. Though not shown, the smartphone device 10 preferably has a power source, such as, for example, a rechargeable or replaceable battery that may be accessed through a removable panel (not shown) provided on the casing 12. The smartphone device 10 preferably has circuitry, and includes a number of circuit elements, such as, for example, a processor, a memory, a digital signal processor, a microphone, a speaker, an amplifier, an antenna, and analog to digital and digital to analog converters. The smartphone device 10 preferably may have other elements that are associated to operate with the circuitry of the smartphone device 10, such as, for example, a camera. Preferably, a power port 14 is provided to facilitate charging of the battery and/or supplying power to the smartphone device 10. The power port 14 may be configured to accept a compatibly provided power source that has suitable amperage and voltage to charge the battery or supply power to the circuitry, circuit elements and other accessibility elements of the smartphone device 10. According to one embodiment, the power port 14 is provided as a separate port, while according to other embodiments, the power port is provided as part of a port that connects the smartphone device 10 with the shell unit 11.

The smartphone device 10 preferably includes a connector port 15 that provides a connection with the circuitry of the smartphone device 10, and more preferably, is configured to connect with a matingly compatible connection on the shell unit 11. Preferably, the shell unit 11 has a housing 20 with a holder 22. The holder 22 is shown comprising a slot 23 provided in the shell unit housing 20 for receiving the smartphone device 10 within the slot 23. A matingly compatible connection is provided on the shell unit 11 shown comprising a connector 24 provided within the slot 23 for connecting with the connector port 15 of the smartphone device 10. The shell unit 11 preferably links with the smartphone device circuitry through the connector 24.

The shell unit 11 is configured to operate in conjunction with the smartphone device 10. The shell unit 11 is shown having a housing 20 with a holder 22 in which the specially configured mobile telephone, such as, the smartphone device 10 may be releasably held. According to preferred embodiments, the shell unit holder 22 is configured as a slot 23 into which the smartphone device 10 is received. The slot 23 preferably is constructed to support the smartphone device 10 while including a connector 24 that interfits with a connector 15a of the smartphone device connector port 15. According to a preferred embodiment, the smartphone device 10 includes a link to connect the smartphone device power circuit with the power circuitry of the computing unit 11 to provide for recharging the smartphone device 10 power source, such as, the battery, when the smartphone device 10 is connected to the shell unit 11. The power circuit of the shell unit 11 may be configured to power the smartphone device 10, or may be selectively regulatable to power or charge the smartphone device 10 or its battery. The shell unit 11 may be powered with a battery that may be housed in the housing 20 of the shell unit 11, or alternately or in addition thereto, may be powered with a power supply that connects with a standard power outlet that provides power supplied from an electric utility company.

The shell unit 11 may have an indicator, such as, one or more LED's, that indicate a condition of the smartphone device 10 being connected with the shell unit 11, and in addition, the LED's may be used to indicate a power condition, such as, for example, the charging of the smartphone device 10 connected to the shell unit 11.

The shell unit 11 preferably includes an interface operably associating the shell unit 11 with a mobile telephone. The shell unit 11 preferably includes circuitry, and the interface preferably includes software, hardware or both. Interface software may comprise software configured with instructions for implementing instructions to control the interaction between the smartphone device 10 and the shell unit 11, including the shell unit display 30 and keyboard 31, an optional additional components connected for use with the shell unit 11, such as, for example, a mouse 40, monitor 41 and keyboard 42 (see FIG. 4). The hardware interface may comprise a connection for releasably connecting the mobile smartphone device 10 with the shell unit 11, including the connector 24 of the shell unit 11 and the connector 15a of the smartphone device 10. The shell unit 11 preferably includes one or more computing components which preferably are operably configured to receive instructions from the mobile smartphone device 10 when the phone device 10 is releasably held in the holder 22 of the shell unit 11. According to embodiments where the shell unit 11 is provided having its own processor, interface software may comprise software configured with instructions to control the processor of the shell unit 11.

Figure 3A:
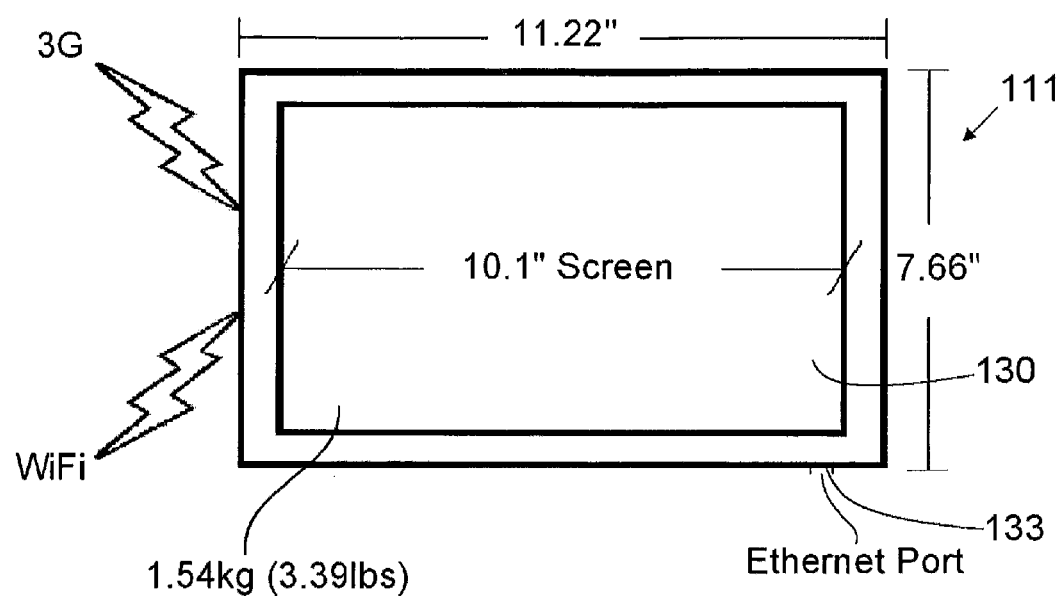
FIG. 3a is a top plan view of an alternate embodiment of a shell unit according to my invention.
Figure 3B:
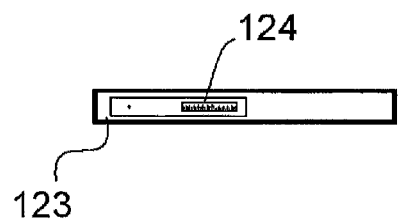

As shown in FIGS. 3a and 3b, the shell unit 111 is illustrated in an alternate embodiment comprising a tablet configuration having a screen display 130. The shell unit 111 may be constructed with a holder 123 and a connector 124, similar to the shell unit 11, and may be provided with software for implementing the functions to permit the smartphone device 10 to operate in connection with the tablet shell unit 111. An ethernet port 133 preferably is provided. In FIGS. 3a and 3b, examples of preferred dimensions and weight for an exemplary embodiment are provided.

Figure 4:
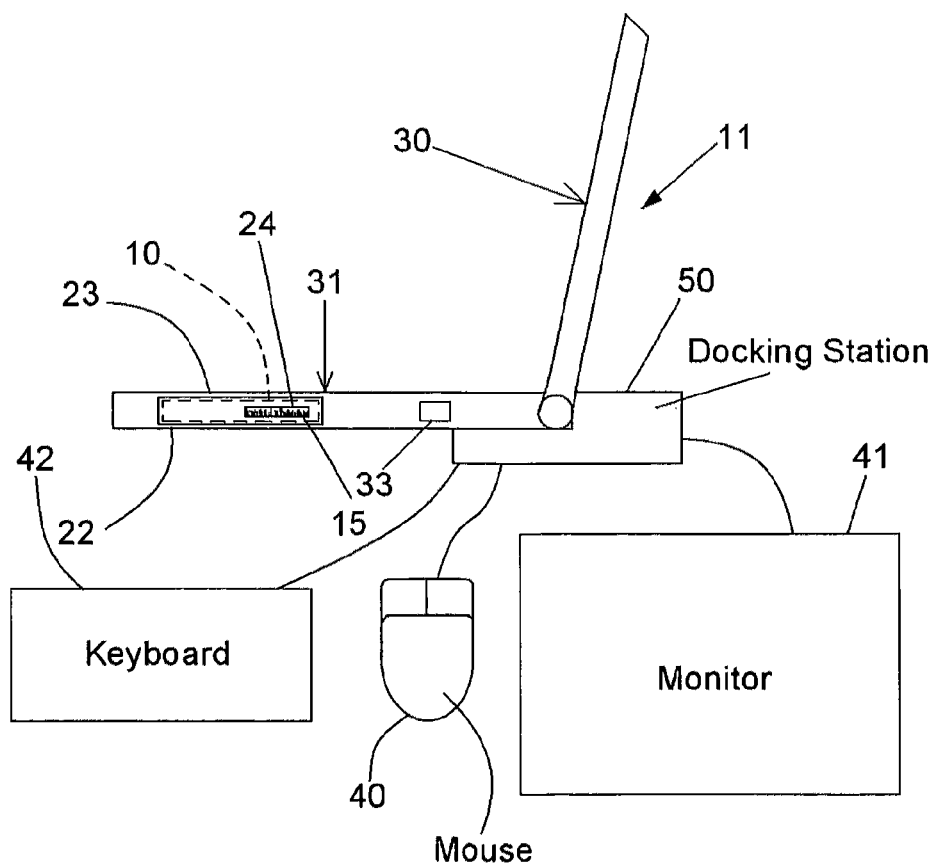
FIG. 4 is a schematic illustration of the shell unit of FIG. 2 shown with an optional docking station, keyboard, mouse and monitor.

According to one embodiment, the mobile smartphone 10 is configured with software that implements instructions to recognize the shell unit 11 and the components connected to or associated with the shell unit 11, such as, for example, the mouse 40, monitor 41 and keyboard 42 shown in FIG. 4. According to a preferred embodiment, the computing components of the shell unit 11 preferably include a processor, a memory and a storage component. The storage component may be configured as a removable storage component. The interface preferably operably associates the shell unit 11 with the operating system of the mobile smartphone device 10. According to a preferred embodiment, the mobile smartphone device operating system is provided on the mobile telephone device 10 and is operable to control the display of the computing unit 11

For example the shell unit 11 preferably includes a keyboard 31, and includes a hardware circuitry and is configured to associate the mobile smartphone device 10 with one or more computing components, such as the peripheral keyboard 40 (FIG. 4), and provide operation of the keyboard 40 and other computing components through the mobile smartphone device 10.

According to a preferred embodiment the shell unit 11 may have a processor that is symmetrical with the processor of the mobile smartphone device 10.

According to a preferred embodiment, the connector 15a of the smartphone device 10 is preferably provided as a universally standardized connector that permits the smartphone device 10 to be utilized with the shell unit 11 regardless of the carrier that provides the service to the smartphone device 10. One example of this configuration is where the connection is an industry standard and all smartphone devices of several manufactures, such as, for example, the smartphone device 10, have a female connection that permits the smartphone device 10 to connect with the shell unit 11. According to preferred embodiments, components that the smartphone device 10 could plug into, such as, for example, an automobile, may include a matingly associated male connection for connection with the female connection of the smartphone device 10. The shell unit 11 preferably is provided with the connection to connect with a smartphone connector, and the shell unit 11, according to preferred embodiments, is configured to operate or be operated using a variety of smartphones, including those of different carriers. According to preferred embodiments, the shell unit 11 may receive and operate with a number of smartphones, so that a single shell unit 11 may be purchased and taken along a trip or to a show, and multiple users having different smartphones would be able to connect their smartphones to the shell unit 11 when the user needs to use the features of the shell unit 11. According to one embodiment, there is provided an industry standard where there are a number of smartphone manufacturers and a number of expansion board\accessory (e.g., other components) from other manufacturers that the smartphone device 10 may plug into.

Figure 2:
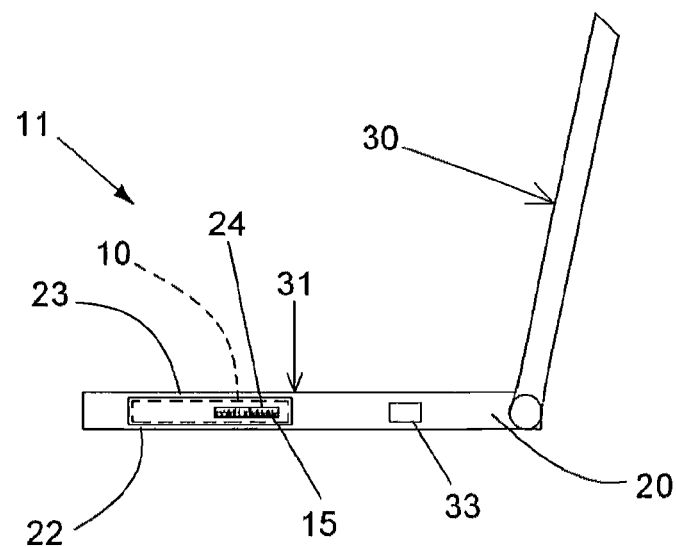
FIG. 2 is a left side elevation view of a shell unit according to an embodiment of my invention.

According to a preferred embodiment, the shell unit 11 includes a processor, RAM, and hard drive. The shell unit 11 may be configured with an Ethernet port 33 (FIGS. 2, and 4). According to some embodiments, the shell unit 11 is configured so that an operating system may be installed on the memory or storage component of the shell unit 11, such as, for example, a hard drive. According to this embodiment, the shell unit 11 may be optionally configured so that it may be booted up and used without the smartphone device 10 inserted. According to preferred embodiments, the operating systems, programs, and data of the smartphone device 10 and shell unit 11 are configured to sync when the smartphone device 10 is inserted into the shell unit 11. According to a preferred arrangement, in order to sync the smartphone device 10 and shell unit 11, a log is kept in each while the smartphone device 10 and shell unit 11 are separated. The logs preferably keep track of operating system configuration changes, programs installed, and new files put on the devices phone device 10, shell unit 11, and computing components that may be used therewith. Where the two hard drives are identical (such as, for example, a hard drive of the phone device 10 and a hard drive the shell unit 11) once synced, this provides redundancy if one of the hard drives was ever damaged. Preferably, the hard drive on the shell unit 11 may be larger in capacity. According to some embodiments, a partition on a larger capacity hard drive of the shell unit 11 may be the same size as and mirror the hard drive on the smartphone device 10. According to a preferred embodiment, the additional space on the larger shell unit 11 hard drive may be another partition used for archiving files not recently accessed.

The smartphone device 10 may be used in connection with conducting business, recreation or other types of communication and computing. For example, the smartphone device 10 may be used in connection with the shell unit 11 to facilitate reviewing and editing documents. The following examples are proposed illustrative uses of the smartphone device 10, which, in the examples, is referred to as the Keystone device 10, and the associated keystone shell unit 11.

Example 1

A businessperson, traveling home from work on the subway, receives on his Keystone smartphone device 10, in smartphone mode, an urgent e-mail from his boss or employer saying he needs to look over and edit the attached proposal, in Word® format, and forward it on to a client ASAP. The attached document is cumbersome to view on the Keystone small smartphone device screen and even more cumbersome to edit given the small keyboard of the keystone device 10. The businessperson pulls out from the business person's briefcase the Keystone shell 11, configured as a tablet, and inserts the smartphone device 10 into shell unit 11. Now, the businessperson can easily review and edit proposal and forward onto client given the larger screen display 30 and keyboard 31 of the shell 11.

Example 2

Texting Via Outlook

A person is in a coffee shop. The person previously had received a text message from a friend while the smartphone device 10 was in smartphone mode and now desires to respond using the Keystone device 10 in netbook mode. In the netbook mode, the smartphone device 10 is held within the holder 22 of the Keystone shell unit 11. The user of the Keystone device 10 and shell unit 11 wants to respond to the previously received text message from a friend. The user desiring to respond to the text message, using the keyboard 31 of the shell unit 11 and viewing the display 30 of the shell unit 11, opens an Outlook® program, which is configured or modified to send and receive texts, and responds to the text message.

Example 3

Receive Phone Call while in Hybrid Mode

A person is in a coffee shop is using the Keystone device 10 and Keystone shell 11 in netbook mode, and the person receives a phone call. To answer, the person taps the appropriate place or button on the touchscreen of the device 10 and begins talking. The person using the Keystone device 10 and shell unit 11 in netbook mode prefers that the caller's voice not be heard by others, so the person using the device 10 and shell unit 11 taps a button (actual or touchscreen) which suspends the Keystone's operation in hybrid mode and ejects the Keystone smartphone device 10 from the shell unit 11. The person then uses the smartphone device 10, as a telephone, in smartphone mode, to continue the conversation, using the microphone and speaker of the smartphone device 10. The person may use the smartphone device 10 and shell unit 11 in hybrid mode (e.g., as a netbook and phone) and prevent the incoming caller's voice from being broadcast to those nearby by using a Bluetooth® ear and microphone piece to talk through Keystone device 10 and Keystone shell unit 11 in hybrid mode.

Example 4

Remotely Deposit Checks and have Transaction in Quickbooks

A contractor is handed a check from one of his customers. The contractor takes a picture of front and back of check with Keystone device 10 in smartphone mode and then deposits over the Internet with his bank (this is possible now with a few banks and is expected to become more widely available). With a couple of touches, the contractor can then sync this transaction with Quickbooks which is installed on the Keystone device 10. The transaction is now in the Quickbooks database to be viewed, edited, or aggregated as part of a report when the contractor is back at his office using Quickbooks on the Keystone device 10 and Keystone shell unit 11 in netbook mode.

Example 5

Keystone in Stationary Places

A Keystone user uses the Keystone device 10 and Keystone shell 11 in netbook mode continually at the same spot at the office or at home. To take advantage of an even larger screen (such as, for example, the monitor 41 in FIG. 4), multiple screens, an ergonomic keyboard, an ergonomic mouse, or printer, the user places the Keystone device 10 and Keystone shell 11 in netbook mode into a docking station 50 which is connected to the afore mentioned peripherals (shown in FIG. 4 comprising a mouse 40, monitor 41 and a keyboard 42).

Example 6

Keystone in Car

A user of the Keystone smartphone device 10 and Keystone shell 11, while at the office using the Keystone smartphone device 10 and shell unit 11 in netbook mode, calls up directions via MapQuest to a destination that the user is thinking about visiting after work. After viewing the directions and deciding that destination is not too far out of the user's way when going home, the user saves directions to a file instead of printing it out. In this example, the file to which the directions are saved is at least stored on the smartphone device 10. Later, when the user gets into the user's car, the user inserts the user's Keystone smartphone device 10 into a slot on the dashboard of the car which has a male connection like the shell unit 11. The car has a touchscreen and a GPS system. Via the car's touchscreen, the user can retrieve and call up the file, and the GPS application of the car will now guide user to the user's destination. Also in this example, the Keystone device 10 is now connected to the car's satellite antennae system. The connection of the Keystone device 10 with the satellite antenna provides for reception of signals that the Keystone device 10 may receive and process for transmission or display on the car's screen or touch screen.

Example 7

Keystone Watching Video

A Keystone device user is watching a movie over the Internet on the user's way home from work, on a subway, with the Keystone smartphone device 10 and Keystone shell unit 11 in tablet mode. When it is time to exit the subway and continue on the other steps of the user's commute, which, in this example, are not ideal for movie watching, the user pauses the movie. The user at this time also removes the Keystone smartphone device 10 from the shell unit 11. When the user arrives home, the user then takes the Keystone device 10 (which is in smartphone mode) and inserts the smartphone device 10 into the user's flat screen TV, Internet ready TV, which has a male connection like the shell unit 11 for connecting with the smartphone device 10. The user can now continue to watch the movie on the TV, and may continue from the point of the movie that the user previously had stopped watching the movie.

According to preferred embodiments, smartphone device 10 preferably is configured with a connector and interface that is an industry standard. For example, smartphone devices 10 may be constructed would having a female connector.

According to preferred embodiments, shell unit 11 may be converted from netbook to tablet, and the smartphone device 10 may be held inside of the shell unit 11. The netbook mode permits use of the shell unit 11 and computing components attached thereto. The hybrid mode preferably is a configuration that permits the smartphone device 10 to function as a phone (to make and receive calls) and permits shell unit 11 to be used as a netbook type computer. The smartphone device 10 and shell unit 11 preferably are configured with software that implements one or more modes of operation (e.g., hybrid, netbook, phone) based on user selections or predetermined configuration settings. According to this arrangement, a user may easily just carry around the shell unit 11 in tablet mode with the smartphone device 10 tucked safely inside the shell unit 11. The fact that the shell unit 11 has an additional processor, RAM and hard drive makes the smartphone device 10 combined with the shell unit 11a fully capable computer.

The smartphone device 10 may be economically produced to sell for about the average price of a smartphone (currently about $150-$200). The shell unit 11 may be about the price of an IPAD (currently about $400 to $600). As stated above, the Keystone smartphone device 10 and Keystone shell unit 11, according to some embodiments, may operate separately from one another, and may be configured so they may be offered to the consumer as items the consumer may purchase separately, although, when paired together, the smartphone device 10 and shell unit 11 associate to provide features and advantages, as shown and described herein. Many consumers today have a smartphone and a computer. With the Keystone device 10 and shell unit 11, people, when time to get a new smartphone or computer, may purchase smartphones or computers that are Keystone compatible (e.g., compatible with the smartphone device 10 and/or shell unit 11).

According to embodiments where the shell unit 11 is provided having its own processor, interface software may comprise software configured with instructions to control the processor of the shell unit 11, the processor of the smartphone 10 or both processors.

Figure 5:
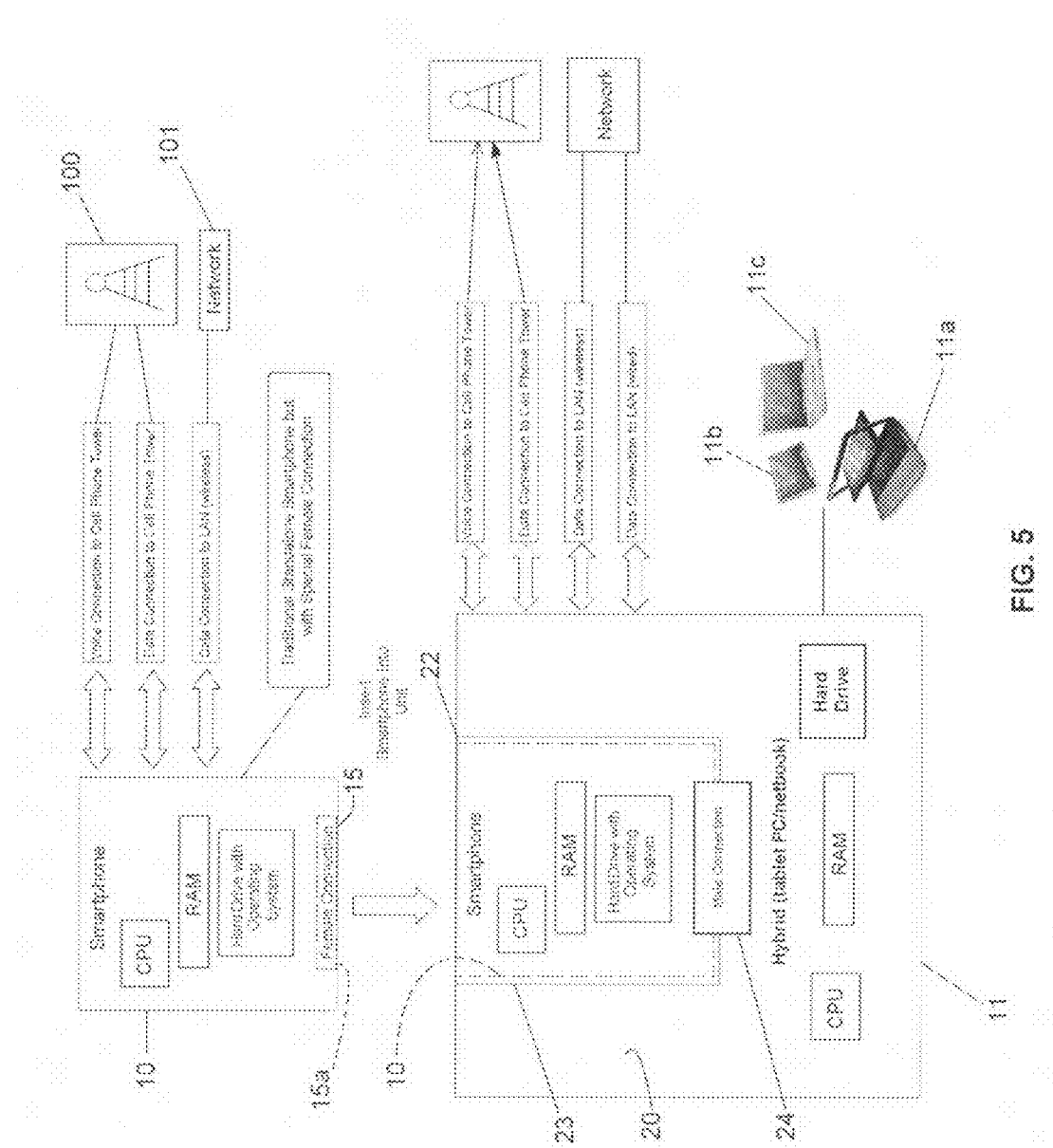
FIG. 5 is a schematic illustration showing a smartphone device and an associated shell unit with a holder shown in the shell unit for receiving the smartphone, where the schematic shows representations of communications.

FIG. 5 illustrates a schematic representation where communications are shown, including cellular communications, occurring on a voice band or connection and/or a data band or connection, that may be transmitted between the smartphone device 10 and the cellular network/tower 100 and to a local area network (LAN) 101. The shell unit 11 also is illustrated with the smartphone device 10 received in the slot 23 of the shell unit holder 22. The shell unit 11 may be operated to carry out communications, including those described in connection with the smartphone 10, as well as wired LAN communications. The wired LAN communications may be utilized, for example, where the shell unit 11 is placed at a particular location, and where the smartphone 10 is connected for use at that location to the shell unit 11. The shell unit 11 in FIG. 5 is represented as a hybrid (tablet PC/netbook), and as shown in FIG. 5 may be any one of the exemplary embodiments shown, including a hybrid 11a, a tablet 11b or a netbook 11c. The shell unit 111 shown in FIGS. 3a and 3b, may also be utilized in connection with the communications shown and described in conjunction with FIG. 5.

While the invention has been described with reference to specific embodiments, the description is illustrative and is not to be construed as limiting the scope of the invention. Various modifications and changes may occur to those skilled in the art without departing from the spirit and scope of the invention described herein and as defined by the appended claims.

What is claimed is:

1. A mobile smartphone having an interface to interface with an apparatus for facilitating computing operations that includes a housing and a display, wherein the housing has a holder for releasably holding said mobile smartphone, wherein said mobile smartphone has a first processor;

wherein said housing houses therein a housing held processor that comprises a symmetrical processor symmetrical with said first processor of said mobile smartphone;

wherein said apparatus and said mobile smartphone are operable in one or more modes, including a smartphone mode where the smartphone is not controlling or controlled by the associated apparatus, and a hybrid mode where the smartphone is operable to receive and place calls on a mobile network and carry out associated computing functions with said apparatus and computing component connected with said apparatus; wherein said mobile smartphone includes a storage component, and wherein software for implementing a management program is provided on said apparatus, wherein the mobile smartphone includes application data stored on said storage component, and wherein said application data of said mobile smartphone is stored on said apparatus, and wherein an association is implemented by said apparatus to recognize said mobile smartphone, and wherein said mobile smartphone and said apparatus are linked together to provide a controlled data exchange and backup of said mobile smartphone application data, wherein said apparatus may manage the data removed from and stored on said mobile smartphone, so that there is mobile smartphone application data stored on said apparatus which is not in use by said mobile smartphone;

wherein the mobile smartphone has an operating system, application programs and application data, and wherein said operating system, said application programs, and said application data of said smartphone are configured to sync the mobile smartphone and apparatus when the mobile smartphone is inserted into the apparatus, and wherein an event log is kept in said apparatus and in said mobile smartphone and including when said mobile smartphone and said apparatus are not connected, said logs including information to keep track of operating system configuration changes, programs installed, and new files added to the mobile smartphone and the apparatus, wherein said mobile smartphone storage component comprises a hard drive and wherein said apparatus has a storage component comprising a hard drive, and wherein said mobile smartphone hard drive and said apparatus hard drive are identical hard drives, and wherein said identical hard drives are maintained in a synced condition to provide redundancy that may secure data in the event one of said hard drives is damaged.

2. The apparatus of claim 1, including an interface operably associating the apparatus with said mobile smartphone.

3. The apparatus of claim 2, wherein said apparatus includes circuitry, and wherein said interface comprises one or the other or both of software and hardware, wherein said software comprises software for implementing instructions to control the interaction between the mobile smartphone and the apparatus, and wherein said hardware comprises a connection for releasably connecting said mobile smartphone with said apparatus circuitry.

4. The apparatus of claim 3, comprising a plurality of computing components, said computing components being operably configured to receive instructions from said mobile smartphone releasably held in said holder.

5. The apparatus of claim 4, wherein said computing components comprise a processor, a memory and a storage component.

6. The apparatus of claim 5, wherein said storage component comprises a removable storage component.

7. The apparatus of claim 5, further including a keyboard, and including a hardware component connected with said apparatus circuitry and configured to associate said mobile smartphone with one or more of said computing components, said display and said keyboard and provide operation of said one or more computing components through said mobile smartphone.

8. The apparatus of claim 3, wherein said interface operably associates the apparatus with the operating system of the mobile smartphone, and wherein said mobile smartphone operating system is operable to control said display.

9. The apparatus of claim 1, further including a keyboard.

10. The apparatus of claim 1, wherein said housing holder comprises a slot therein for receiving a mobile telephone in said slot, and wherein said slot includes at least one connector for connecting said mobile smartphone with said apparatus circuitry.

11. The apparatus of claim 10, including a hardware component connected with said apparatus circuitry and configured to associate said mobile smartphone with the display of said apparatus.

12. The apparatus of claim 1, wherein said apparatus comprises computing components and is configured for operation with said mobile smartphone, wherein said mobile smartphone has a storage component, and wherein said apparatus is configured with a memory, wherein said apparatus computing components, keyboard and display are configured to operate the functions of the device.

13. The apparatus of claim 1, wherein said apparatus is further configured with an interface that operably associates the device with the mobile smartphone.

14. The apparatus of claim 13, wherein the mobile telephone has an operating system, and wherein said interface operably associates the apparatus with said operating system of the mobile smartphone, and wherein said mobile smartphone operating system is operable to control said display of said apparatus.

15. The mobile smartphone of claim 13, wherein said interface includes instructions for controlling said housing held processor and instructions for controlling said mobile smartphone processor, wherein said housing held processor and said mobile smartphone processor are configured to have access and utilize memory of said mobile smartphone and data stored therein and memory from said mobile smartphone.

16. The mobile smartphone of claim 1, wherein said mobile smartphone is configured to operate said symmetrical processors.

17. A system for facilitating computing operations comprising:
 a) a mobile smartphone; and
 b) shell unit, said shell unit comprising
  a housing;
  a display;
  a keyboard;

said housing having a holder for releasably holding a said mobile smartphone, said holder comprising a slot therein for receiving a said mobile smartphone in said slot;

circuitry; and c) an interface operably associating the apparatus with the said mobile smartphone that is held in said holder slot, said interface comprising one or the other or both of software and hardware, wherein said software comprises software for implementing instructions to control the interaction between the mobile smartphone and the apparatus, and wherein said hardware comprises a connection for releasably connecting said mobile smartphone with said shell unit circuitry;

wherein said mobile smartphone has an operating system and wherein said interface operably associates the shell unit with the operating system of the mobile smartphone, and wherein said mobile smartphone operating system is operable to control said display;

wherein said shell unit further has computing components including a processor, a memory and a storage component, wherein said interface is operable to receive instructions from the mobile smartphone held in said holder and implement instructions to operate said smartphone computing components; and wherein said circuitry is configured to operably connect said interface with said computing components and said mobile smartphone; and wherein said shell unit processor comprises a processor that is symmetrical with the processor of said mobile smartphone;

wherein said apparatus and said mobile smartphone are operable in one or more modes, including a smartphone mode where the smartphone is not controlling or controlled by the associated apparatus, and a hybrid mode where the smartphone is operable to receive and place calls on a mobile network and carry out associated computing functions with said apparatus and computing component connected with said apparatus; wherein said mobile smartphone includes a storage component, and wherein software for implementing a management program is provided on said shell unit, wherein the mobile smartphone includes application data stored on said storage component, and wherein said application data of said mobile smartphone is stored on said apparatus, and wherein an association is implemented by said apparatus to recognize said mobile smartphone, and wherein said mobile smartphone and said apparatus are linked together to provide a controlled data exchange and backup of said mobile smartphone application data, wherein said apparatus may manage the data removed from and stored on said mobile smartphone, so that there is mobile smartphone application data stored on said apparatus which is not in use by said mobile smartphone;

wherein the mobile smartphone has application programs and application data and wherein said operating system, said application programs, and said application data of said smartphone are configured to sync the mobile smartphone and shell unit when the mobile smartphone is inserted into the shell unit, and wherein an event log is kept in said shell unit and in said mobile smartphone and including when said mobile smartphone and said shell unit are not connected, said logs including information to keep track of operating system configuration changes, programs installed, and new files added to mobile smartphone and the shell unit, wherein said mobile smartphone storage component comprises a hard drive and wherein said shell unit storage component comprises a hard drive, and wherein said hard drives are identical hard drives, and wherein said identical hard drives are maintained in a synced condition to provide redundancy that may secure data in the event one of said hard drives is damaged.

18. An apparatus for facilitating computing operations comprising:

a housing;

a display;

a keyboard;

said housing having a holder for releasably holding a mobile smartphone, said holder comprising a slot therein for receiving a mobile smartphone in said slot;

circuitry;

an interface operably associating the apparatus with a mobile smartphone that is held in said holder slot, said interface comprising one or the other or both of software and hardware, wherein said software comprises software for implementing instructions to control the interaction between the mobile smartphone and the apparatus, and wherein said hardware comprises a connection for releasably connecting said mobile smartphone with said apparatus circuitry;

wherein said mobile smartphone has an operating system and wherein said interface operably associates the apparatus with the operating system of the mobile smartphone, and wherein said mobile smartphone operating system is operable to control said display;

wherein said apparatus further has computing components including a processor, a memory and a storage component, wherein said interface is operable to receive instructions from the mobile smartphone held in said holder and implement instructions to operate said apparatus computing components; and wherein said circuitry is configured to operably connect said interface with said computing components and said mobile smartphone;

wherein said apparatus processor comprises a processor that is symmetrical with the processor of said mobile smartphone, and wherein said mobile smartphone is configured to operate said symmetrical processors;

wherein said apparatus and said mobile smartphone are operable in one or more modes, including a smartphone mode where the smartphone is not controlling or controlled by the associated apparatus, and a hybrid mode where the smartphone is operable to receive and place calls on a mobile network and carry out associated computing functions with said apparatus and computing component connected with said apparatus; wherein said mobile smartphone includes a storage component, and wherein software for implementing a management program is provided on said apparatus, wherein the mobile smartphone includes application data stored on said mobile smartphone storage component, and wherein said application data of said mobile smartphone is stored on said apparatus, and wherein an association is implemented by said apparatus to recognize said mobile smartphone, and wherein said mobile smartphone and said apparatus are linked together to provide a controlled data exchange and backup of said mobile smartphone application data, wherein said apparatus may manage the data removed from and stored on said mobile smartphone, so that there is mobile smartphone application data stored on said apparatus which is not in use by said mobile smartphone;

wherein the mobile smartphone has an operating system, application programs and application data, and wherein said operating system, said application programs, and said application data of said smartphone are configured to sync the mobile smartphone and apparatus when the mobile smartphone is inserted into the apparatus, and wherein an event log is kept in said apparatus and in said mobile smartphone and including when said mobile smartphone and said apparatus are not connected, said logs including information to keep track of operating system configuration changes, programs installed, and new files added to mobile smartphone and the apparatus, wherein said mobile smartphone storage component comprises a hard drive and wherein said apparatus storage component comprises a hard drive, and wherein said hard drives are identical hard drives, and wherein said identical hard drives are maintained in a synced condition to provide redundancy that may secure data in the event one of said hard drives is damaged.

19. The apparatus of claim 18, wherein said interface includes instructions for controlling said apparatus processor and instructions for controlling said mobile smartphone processor, wherein said processors are configured to have access and utilize memory of said mobile smartphone and data stored therein and memory from said smartphone.

* * * * *